June 3, 1952            I. W. LACHER            2,598,802

TESTING APPARATUS FOR VOLTAGE REGULATORS
FOR AUTOMATIC VEHICLES

Filed Feb. 28, 1949

Inventor
Irvin W. Lacher

By W. S. McDowell

Attorney

Patented June 3, 1952

2,598,802

UNITED STATES PATENT OFFICE 2,598,802

TESTING APPARATUS FOR VOLTAGE REGULATORS FOR AUTOMOTIVE VEHICLES

Irvin W. Lacher, Columbus, Ohio

Application February 28, 1949, Serial No. 78,844

2 Claims. (Cl. 175—183)

1

The present invention relates to electrical testing apparatus, and more particularly to an improved electrical testing unit for the voltage regulators of automotive vehicles.

It is the general object of this invention to provide a portable and compact testing unit or package to which may be attached a voltage regulator to determine the condition of such a regulator, and the adjustment necessary to place the regulator in proper operating condition prior to its installation upon an automotive vehicle.

In the past, in testing the voltage regulators of automotive vehicles, it has been necessary to first install the same upon an automotive vehicle in connection with the generator and battery thereof and thereafter determine the operating qualities of the regulator by applying voltmeters and ammeters thereto during operation of the generator of the vehicle. This method of determining whether or not the regulator possessed the desired operating characteristics was extremely laborious, and in the event that the regulator proved to be unsatisfactory or inoperative, it was still necessary to take further steps to ascertain the exact malfunctioning of the regulator, and to install a new regulator upon the vehicle and once again check the same to ascertain its operating qualities.

Accordingly, another object of the present invention is to provide apparatus adapted to test the voltage regulators of automotive vehicles without necessitating the installation of such regulators upon the vehicle.

It is a further object of this invention to provide a voltage regulator testing machine which, in addition to determining the proper overall functioning of a voltage regulator, serves also to indicate the particular source of trouble or malfunctioning of a regulator, in order that steps may be taken to overcome such trouble.

Still another object of the present invention is to provide a voltage regulator test unit which embodies an electric motor-driven generator having a circuit corresponding to the electrical circuit of an automotive vehicle in which is interposed suitable measuring gages operable to inform a person testing the regulator of the operating characteristics of a particular regulator in a quick and facile manner, whereby steps may be taken to correct the faults of such a regulator through proper adjustment of the various instrumentalities contained therein.

Yet another object of the present invention is to provide a testing apparatus of the character described which may be compactly mounted with-

2 in a portable casing or housing which may easily be transported from one location to another, with the operation of the testing apparatus requiring only the power supply of the ordinary household electrical circuit.

For a further understanding of the additional objects and advantages realized from the present invention, reference is made to the following description and the accompanying drawings, wherein.

Figure 1:
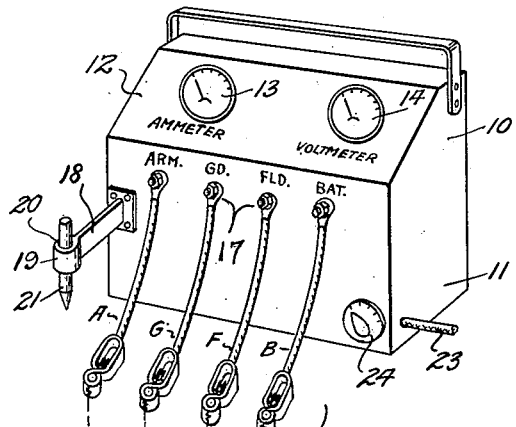
Fig. 1 is a perspective view of a portable voltage regulator test unit formed in accordance with the present invention.

Referring now to Fig. 1 of the drawing, the numeral 10 generally designates the casing or housing of the present voltage regulator testing unit, the same being formed with a substantially rectangular base portion 11 and a diagonally slanting console portion 12 in which is mounted for visual reference an ammeter 13 and a voltmeter 14. Carried internally of the rectangular base portion 11 of the casing is a motor generator, generally designated by the numeral 15.

Extending through the front wall of the housing or cabniet 10, as at 17, are four clamp-type electrical terminals A, G, F and B which are adapted to be connected or clamped upon the corresponding armature terminal a, ground terminal g, field terminal f and battery terminal b of a voltage regulator to be tested.

Connected with the front wall of the cabinet 10 is a bracket 18 which terminates in an enlarged collar portion 19 formed with a vertically extending bore 20 for the sliding and relatively loose reception of a pointed weight member 21, the purpose of which is to be hereinafter more fully described.

Figures 2, 3:
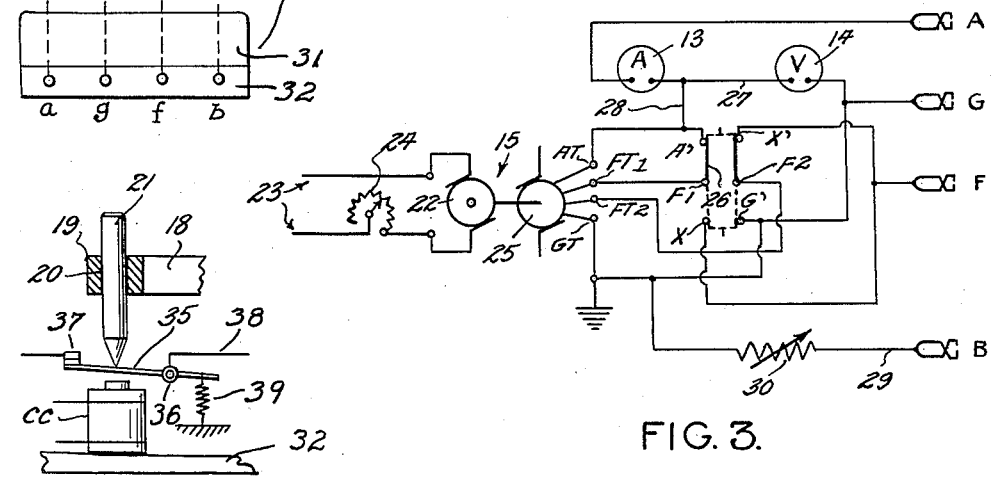
Fig. 2 is a detailed diagrammatic illustration of the amperage-compensating weight element of the present testing unit showing its relation or function with respect to one of the relay coils and armatures of a voltage regulator.
Fig. 3 is a wiring diagram of the electrical circuit and elements of the present regulator testing unit.

Referring now to the wiring diagram disclosed in Fig. 3 of the drawing, it will be seen that the motor generator 15 embodies a variable speed induction motor 22 which is preferably operable from the normal 110 volt, 60 cycle household electrical circuit 23. To control the speed of operation of the motor 22, a rheostat control 24 is connected in series with the motor 22, whereby manual control may be had over the speed of the motor 22 through the operation or setting of the rheostat 24. A generator section 25 is furnished power through the drive shaft of the motor 22 and is provided with an armature terminal AT, a first field terminal FT1, and a second field terminal FT2 which comprise the opposite ends of the generator field, and a ground terminal GT which correspond to like elements provided upon the ordinary generator of the automotive vehicle type. In the usual case, the ground terminal GT is provided by the housing or casing of the generator. The first field terminal FT1 of the generator is directly connected with a first central terminal F1 of a double-pole double-throw switch 26 which is provided with a second central terminal F2 which is directly connected with the second field terminal FT2 of the generator. The switch 26 is further provided with a first set of end terminals A' and X' which are connected respectively with the armature terminal AT of the generator and the clamp-type terminal F of the testing unit. A second set of end terminals X and G' are provided at the opposite end of the switch 26, the terminal X being connected with the clamp terminal F and the terminal G' being electrically connected with the ground terminal GT of the generator. Electrically connected in circuit with the switch terminal G' is the clamp-type terminal G of the testing unit to which is also electrically connected one terminal of the voltmeter 14. The opposite terminal of the voltmeter 14 is electrically connected with a cross lead 27 which is connected at its opposite end with one of the terminals of the ammeter 13 whose opposite terminal is connected with the clamp terminal A of the testing unit. Interconnecting the cross lead 27 with the armature circuit of the generator is another cross lead 28.

Connected with the clamp-type terminal B of the testing unit is a lead 29 which is electrically connected with the ground terminal GT of the generator, and in which is interposed a variable resistance 30.

In operation, the separate clamp terminals A, G, F, and B of the testing unit are connected with the corresponding terminals $a$, $g$, $f$, and $b$ of a voltage regulator, as indicated diagrammatically in Fig. 1. Depending upon the particular type of coltage regulator to be tested, as hereinafter explained, the double-pole double-throw switch 26 is manually set to connect the central field poles F1 and F2 with either set of end poles A', X', or X, G'. The motor 22 is then started at slow speeds, enabling the generator 25 to generate a relatively small amount of current which passes through the armature terminal AT thereof. Current then passes from the terminal AT through the leads 28 and 27 and the ammeter 13 into the clamp terminal A. Current from the terminal A then passes to the terminal $a$ of the voltage regulator, and from there to the windings or coils of the relay switches disposed within the regulator. As the speed of the motor 22 is gradually increased the voltage output of the generator 25 passing to the armature terminal $a$ of the regulator is proportionally increased, and if the particular regulator being tested is in proper working order, a voltage output of approximately 6 volts, as indicated upon the voltmeter 14, will energize one of the coils of the relay switches contained in the regulator sufficiently to close the normally open contacts of such switch and permit current to pass between the armature terminal $a$ of the regulator to the battery terminal $b$, and thence, to the clamp terminal B of the testing unit where the variable resistance 30 serves to dissipate the current in the same manner as would the storage battery of a vehicle without causing a collapse of the field of the generator.

The point at which the normally open contacts of the relay switch within the regulator close is indicated by a sudden increase in the reading of the ammeter 13 which, before closure of such contacts, only indicates the relatively small amount of current passing to the windings or coils of the various relay switches of the regulator, whereas upon closure of such contacts, the ammeter registers the amount of current passing through the battery terminal $b$ of the regulator from the generator. The sudden jump in the reading of the ammeter 13 enables the testing unit operator to ascertain the voltage output necessary to cause the closure of the relay switch which normally controls the passage of current to the battery circuit of an automotive vehicle. If the reading of the ammeter 13 suddenly increases before the voltmeter reaches a desired predetermined reading, then there is an indication that the relay switch of the regulator which controls the closing of the battery circuit of the regulator is functioning improperly, and in all probability that the spring tension which functions to normally hold the contacts of switch open should be increased. Conversely, if the reading of the voltmeter increases above the desired amount before a sudden jump in the reading of the ammeter takes place, then there is an indication that the spring tension upon the contacts of the said relay switch should be decreased to permit of closure at the proper voltage input to the regulator.

When it is desired to test the operation of the current control relay switch of a particular regulator, that is, the relay switch which serves to control the maximum current output of the generator to the battery circuit after initial closure of the battery circuit by the other relay switch of the regulator, and which prevents over-charging by the generator, the removable casing or cover portion 31 of the regulator is removed from the base portion 32 thereof, whereby access may be had to the movable armature 35 associated with the coil $cc$ of the current control relay. In the usual manner, the armature 35 is suitably pivotally supported, as at 36, to swing into and out of engagement with a stationary contact 37 providing one of the poles of the current control relay switch. The armature 35, itself, forms the opposite pole of the switch, and is in circuit by means of a suitable lead wire 38. The armature 35 is normally held in closed engagement with the contact 37 by means of the spring 39 which opposes movement of the armature in response to the attractive forces created upon energization of the coil $cc$. As the current rises within the coil $cc$ to a predetermined desired maximum, usually in the neighborhood of 30 amperes, and if the current control relay is functioning properly, the armature should move out of engagement with the contact 37, against the tension of the spring 39, to open the field circuit of the generator and stop the passage of current from the generator of an automotive vehicle. It will be manifest that the power necessary to drive a generator at speeds sufficient to generate a current of approximately 30 amperes would be relatively great and would require a relatively large motor or engine. Thus, to properly test the current control relay switch of the normal automotive vehicle voltage regulator, it is necessary to either employ a relatively large and heavy electric motor to drive the generator 25, or to employ a means to supplement the current output of ehe generator 25 to ascertain the proper functioning of the current control relay switch. In view of the advantages of a relatively small, compact and lightweight portable testing unit, I preferably use a relatively small electric motor 22 to drive the generator at speeds sufficient to generate a current of approximately 12 amperes and supplement the attractive forces established within the coil cc by means of calibrated weights, as indicated at 21, which rest upon the armature 35 to urge the same to swing toward the coil cc and to open the field circuit of the regulator. Thus, by knowing the relation between the weight 21 and the amount of current that the same replaces, it is possible to obtain an accurate determination of the operating characteristics of the current control relay of a regulator without actually energizing the coil cc with a relatively high current. For instance, when the weight 21 is calibrated to supplant or equal an amperage of say 18 amperes within the coil cc, and it is desired that the current control relay switch shall open at 30 amperes, a current control relay switch which is functioning properly should open at a reading of 12 amperes upon the ammeter 13. In the event that such opening does not occur at the proper reading, then steps may be taken to adjust the spring associated with the armature 35 so as to obtain the proper setting of the current control relay switch.

Thus, by simply removing the cover of the regulator and by placing the armature 35 in proper position beneath the weight 21, and by increasing the speed of the motor 22, the operating characteristics of the current control relay switch of the regulator may be accurately determined.

As previously indicated herein, there are two different standard types of automotive vehicle voltage regulators in present use in this country. The primary difference between the two types of regulators is in the field and ground wiring of the various relay switches contained in the regulators. This difference in wiring is necessitated by the particular type of generator being used in circuit with the regulator. In one type, the field circuit of the associated generator is directly grounded at the generator, whereas in the other type, the field of the generator grounds through the ground circuit of the regulator. To adapt the present regulator testing unit for use with both types of regulators, the double-pole double-throw switch is employed to reverse the field circuit of the generator 25 so as to either directly ground the same within the testing unit, or to connect the same through the field circuit of the regulator before grounding, in order that both types of regulators may be tested without necessitating a change in the wiring circuit of the testing unit.

In view of the foregoing, it will be seen that the present invention provides a mechanically efficient and highly accurate testing machine for automotive vehicle voltage regulators which is characterized by its versatility of use in connection with all standard types of regulators, its ease of operation and its structural simplicity and consequent economy of manufacture.

While a present preferred form of the invention has been disclosed in detail, it will be understood that certain modifications with regard to constructional details may be resorted to without departing from the spirit of the invention or the scope of the following claims.

I claim:
1. Apparatus for testing automotive vehicle voltage regulators of the type having a current control relay switch including a movable armature, and battery, field, armature and ground connections, comprising a portable frame; an electrical induction motor mounted on said frame; means connected in series with said motor for varying the speed thereof; an electrical generator driven by said motor and having an armature terminal, field terminals, and a ground terminal; a first lead extending remotely of said frame for attachment to the armature connection of a regulator to be tested and electrically connected with the armature terminal of said generator; means in said first lead for measuring the passage of current therethrough; a second remote lead for attachment to the ground connection of a regulator and electrically connected between the armature and ground terminals of said generator; a voltmeter connected with said second lead for indicating the voltage passage therethrough; a third remote lead for attachment to the battery connection of a regulator and electrically connected with the ground terminal of said generator; means in said third lead for dissipating current passing therethrough; a fourth remote lead for attachment to the field terminal of a regulator; switch means selectively operable to connect the field terminals of said generator with either said first and fourth leads or with said second and fourth leads; and a calibrated weight arranged to bear against the armature of the current control relay switch of a regulator being tested and thereby to cause the current control relay switch to operate at a current less than that normally required for the operation of such switch.

2. Apparatus for testing automotive vehicle voltage regulators of the type having a current control relay switch including a movable armature, and battery, field, armature and ground connections, comprising a portable frame; an electrical induction motor mounted on said frame; means connected in series with said motor for varying the speed thereof; an electrical generator driven by said motor and having an armature terminal, field terminals, and a ground terminal; a first lead extending remotely of said frame for attachment to the armature connection of a regulator to be tested and electrically connected with the armature terminal of said generator; means in said first lead for measuring the passage of current therethrough; a second remote lead for attachment to the ground connection of a regulator and electrically connected between the armature and ground terminals of said generator; a voltmeter connected with said second lead for indicating the voltage passing therethrough; a third remote lead for attachment to the battery connection of a regulator and electrically connected with the ground terminal of said generator; means in said third lead for dissipating current passing therethrough; a fourth remote lead for attachment to the field terminal of a regulator; switch means selectively operable to connect the field terminals of said generator with either said first and fourth leads or with said second and fourth leads; and means engageable with the armature of the current control relay switch of a regulator being tested during the passage of current therethrough for causing the current control relay switch to operate at a current less than that normally required for the operation of such switch, said last-named means comprising a weight arranged to bear upon the armature of the current control relay switch and calibrated to impart a force thereto equal to the force exerted upon said armature by the passage of a predetermined amount of current through such switch.

IRVIN W. LACHER.

REFERENCES CITED

The following references are of record in the file of this patent:

UNITED STATES PATENTS

| Number | Name | Date |
|---|---|---|
| 2,096,131 | Oestermeyer | Oct. 19, 1937 |
| 2,245,596 | Lindberg | June 17, 1941 |
| 2,352,499 | Sears | June 27, 1944 |

OTHER REFERENCES

Dyke's Automobile Encyclopedia, by A. L. Dyke, Goodheart-Willcox Co., Inc., 1928, Fifteenth Edition, pages 403 and 404.